May 3, 1955
R. H. BRINK
2,707,451
AUTOMOBILE WHEEL POSITION INDICATOR
Filed Feb. 1, 1954
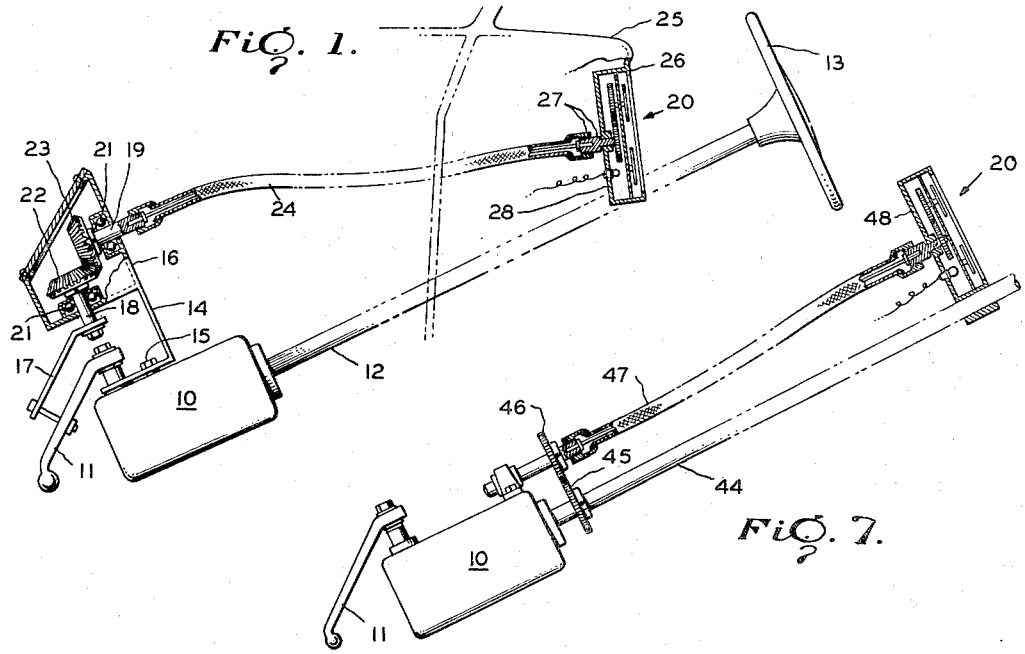
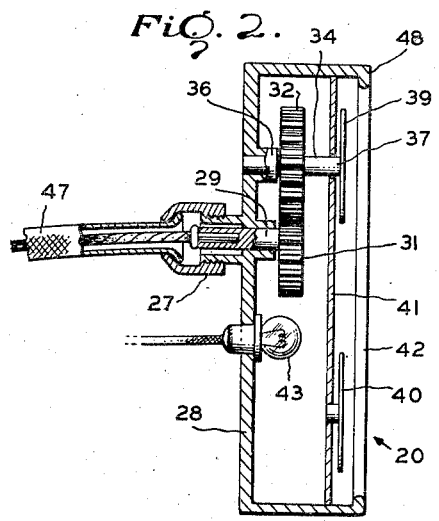
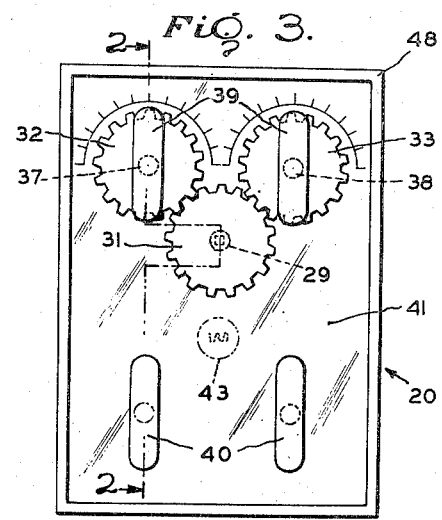
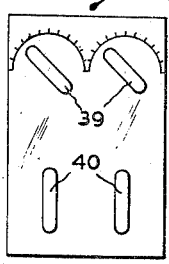
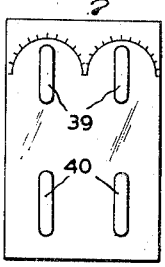
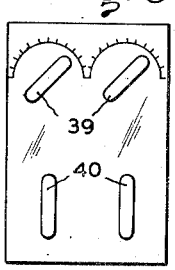
INVENTOR.
Robert H. Brink.
BY
*Gustave Miller*
ATTORNEY.

United States Patent Office 2,707,451
Patented May 3, 1955

2,707,451
AUTOMOBILE WHEEL POSITION INDICATOR

Robert H. Brink, Newark, Del.

Application February 1, 1954, Serial No. 407,383

1 Claim. (Cl. 116—31)

The present invention relates generally to automobile accessories and specifically to an indicator to be incorporated into the instrument panel which will give constant information as to the direction the front wheels are pointed.

The usual arrangement of a steering wheel permits it to be turned completely, or 360 degrees, and more than one complete turn is frequently possible. In the training of new drivers, confusion is often experienced by not having positive knowledge of the exact position of the wheels. Even experienced drivers will benefit by the addition of this invention to their automobiles, in cases where the car's wheels are up against an object like a curb, the exact position of the front wheels when known to the driver will enable him to more easily drive away from the curb or obstruction.

The present invention is useful too in any vehicle such as a hook-and-ladder fire truck which has rear wheels that steer. The addition of this invention to the steering mechanism of such a vehicle enables the front driver to know his rear wheel positions, and, conversely, may be installed both front and rear to give constant information as to the position of either set of wheels.

It is the primary object of the invention therefore to provide a device which may be attached to the steering gear of automobiles now in use and which will indicate the front wheel positions.

Another object of the present invention is to provide a device which may be incorporated into the steering gear of automobiles yet to be manufactured, and which will add little to the cost in view of the wide utility and advantages of the device.

A further object of the present invention is to provide a device of the sort described which has relatively few moving parts and will not impede to any great extent the free action of the steering apparatus of the vehicle to which it is applied.

Yet another object of the invention is to provide such a device with some modification so that it may be used on vehicles having rear steering or dual steering, front and rear.

These and other objects and advantages of the invention will be readily apparent from the following description taken in connection with the annexed drawing, in which:

Fig. 1 is a side elevation view, partly in section, showing one form of the invention as attached to the steering gear of an automobile;

Fig. 2 is a vertical sectional view of the indicator portion of the invention, as seen on line 2—2 of Fig. 3.

Fig. 3 is a front view of the indicator portion of the invention with the gears shown as if the translucent gear cover was removed;

Fig. 4 is a front view of the indicator showing one representation of the front wheels if turned to the left;

Fig. 5 is a similar view of the indicator showing the wheels straight ahead;

Fig. 6 shows the indicator when the wheels are cramped to the right; and

Fig. 7 shows a second embodiment of the invention as incorporated into an automobile's steering apparatus during its manufacture.

Referring to the drawing in more detail, the steering gear of the automobile is indicated as a gear box 10 with a pitman arm 11, a steering column 12 ending in the steering wheel 13, all of more or less conventional construction.

The invention consists of a bracket 14 secured to the gear box 10 by removal and replacement of one of the cover bolts 15, and it supports the frame 16 in such a manner that the arm 17 may be attached to the pitman arm 11 for movement therewith. As illustrated here, the pitman arm 11 is shown on the top of the gear box 10, but it is understood that any other position is also suitable.

The frame 16 has secured therein shafts 18 and 19, each with a bearing 21 and bevel gears 22 and 23, the latter of which drives the flexible shaft 24 in response to the movement of the arm 17. Secured to or incorporated into the dash 25 is the indicator 20 of the invention, which, in its simplest form, is a casing 26 having the flexible shaft coupling 27 entering the rear portion 28 and driving the shaft 29 on which is a sun gear 31. In mesh with the sun gear 31 are two planetary gears 32, 33 which are secured to short shafts 34, respectively, each journaled in the sockets 36 and having on their ends 37, 38 an elongated representation 39 of a tire, and preferably rounded in contour and with rounded ends. A second pair of identical tire representations 40 are also within the casing 26 at the lower end thereof and are fixed in position. A translucent sheet 41 supports these second pair of tire representations and also separates the casing 26 into the rear portion 28 and a front portion 42, with a means of illumination 43 behind it, so that both sets of tire representations are shown in outline or in shadow, depending on the location of the illuminating means.

Figs. 4 to 6 are self explanatory, and in Fig. 7, another embodiment of the invention is shown, in which the column 44 has a spur gear 45 meshing with a second spur gear 46 which drives the flexible cable 47 and in like manner operates to move the gears in the casing 48, which may be fastened to the housing about the column 44.

The operation of the invention is apparent from the drawings and the description. In the case of a fire truck or other vehicle having rear wheels that are steered, a second flexible cable and second set of gears would serve the representations of the rear wheels. Many changes and modifications in the invention are possible and may be desired, and other embodiments are also contemplated without departing from the spirit and scope of the invention as set forth in the appended claims.

What is claimed is:

A steered wheel indicator for an automobile having a steering gear, a steering gear box and a pitman arm extending from said gear box, comprising a casing adapted to be mounted on the dash of said automobile, and having a front portion and a rear portion, a translucent sheet positioned in said casing between said front and rear portion, representations of a pair of rear tires secured to said sheet at its lower end, a pair of shafts journaled in said casing in said rear portion thereof and having their ends projecting through apertures in said sheet, a pair of front tire representations secured one to each of said pair of shafts, a planetary gear on each shaft in said casing behind said sheet, a flexible shaft coupling journaled in said casing in said rear portion, a shaft in said casing in said rear portion, a shaft in said casing drivably connected to said flexible shaft coupling, a sun gear secured on said shaft and drivably engaged with said planetary gears, and means for moving said front tire representation in accordance with the position of the front wheels, said means including a housing, a first bevel gear in said housing a flexible shaft journaled in said coupling drivably connecting said bevel gear and sun gear, a second bevel gear in mesh with said first bevel gear, a shaft mounting said second gear, and extending through said housing, a second pitman arm extending from said last mentioned shaft exteriorly of said housing in alignment with said first mentioned pitman arm and a connection between said first and second pitman arms whereby they move in synchronism.

References Cited in the file of this patent

UNITED STATES PATENTS 2,439,476     Leggett _____ Apr. 13, 1948

FOREIGN PATENTS 751,304     France _____ June 19, 1933